United States Patent
Yusu et al.

(10) Patent No.: US 7,542,404 B2
(45) Date of Patent: Jun. 2, 2009

(54) OPTICAL RECORDING MEDIA

(75) Inventors: Keiichiro Yusu, Yokohama (JP); Sumio Ashida, Yokohama (JP); Tsukasa Nakai, Hino (JP); Shinichi Tatsuta, Tokyo (JP); Hideki Ito, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 661 days.

(21) Appl. No.: 11/181,984

(22) Filed: Jul. 15, 2005

(65) Prior Publication Data

US 2006/0077869 A1 Apr. 13, 2006

(30) Foreign Application Priority Data

Sep. 30, 2004 (JP) ............................. 2004-286584

(51) Int. Cl.
  *G11B 7/24* (2006.01)
(52) U.S. Cl. .................................................. 369/275.1
(58) Field of Classification Search ................ 369/286, 369/275.1, 275.2, 272.1, 283; 428/64.4, 428/64.5, 836
See application file for complete search history.

(56) References Cited

U.S. PATENT DOCUMENTS

| 6,699,637 | B2 * | 3/2004 | Ogawa et al. .......... 430/270.13 |
| 6,724,715 | B1 * | 4/2004 | Kim et al. ................ 369/275.1 |
| 7,057,252 | B2 * | 6/2006 | Uno et al. .................... 257/432 |
| 2005/0221049 | A1 * | 10/2005 | Inoue et al. ................ 428/64.4 |
| 2005/0232129 | A1 * | 10/2005 | Matsumoto et al. ...... 369/275.2 |
| 2006/0028970 | A1 * | 2/2006 | Kondo et al. ............. 369/275.1 |
| 2006/0044991 | A1 * | 3/2006 | Nishihara et al. ........ 369/272.1 |

FOREIGN PATENT DOCUMENTS

| CN | 1347082 A | 5/2002 |
| EP | 1 187 119 A2 | 3/2002 |
| JP | 58-62094 | 4/1983 |
| JP | 10-188346 | 7/1998 |
| JP | 11-185290 | 7/1999 |
| JP | 2003-338077 | 11/2003 |
| JP | 2004-87073 | 3/2004 |
| WO | WO 02/31825 | 4/2002 |

OTHER PUBLICATIONS

Duseop Yoon, et al. "Super Resolution Read Only Memory Dic Using Super-Resolution Near-Field Structure Technology", Japanese Journal of Applied Physics, vol. 43, No. 7B, 2004, pp. 4945-4948.

(Continued)

*Primary Examiner*—Angel A. Castro
(74) *Attorney, Agent, or Firm*—Oblon, Spivak, McClelland, Maier & Neustadt, P.C.

(57) ABSTRACT

An optical recording media has a disc substrate and two or more recording layers arranged apart from each other with a dielectric layer interposed therebetween to cause optical change simultaneously by irradiation with light, in which a first recording layer positioned near the disc substrate has a higher optical change temperature and a higher extinction coefficient compared with those of a second recording layer and a later recording layer.

22 Claims, 3 Drawing Sheets

OTHER PUBLICATIONS

Huang Xiuguang, et al. "Study of Recordable CD Inorganic Memory Medium-AgOx", Journal of Inorganic Materials, vol. 13, No. 3, Jun. 1998, pp. 440-444 (with English Abstract).

M. Kuwahara, et al., "thermal Original of Readout Mechanism on Super Resolution Near-Field Structure Disk - Appearance of super resolution readout by thermal effect," Technical Report of IEICE, the Institute of Electronics, Information and Communication Engineers, Mar. 2004, Chapter 3.1.

J. Tominaga et al., "Principle of Super Lens and the Progress," Technical Report of IEICE, the Institute of Electronics, Information and Communications Engineers, Sep. 1999, Fig 3.3.

* cited by examiner

OPTICAL RECORDING MEDIA

CROSS-REFERENCE TO RELATED APPLICATIONS

This application is based upon and claims the benefit of priority from prior Japanese Patent Application No. 2004-286584, filed Sep. 30, 2004, the entire contents of which are incorporated herein by reference.

BACKGROUND OF THE INVENTION

1. Field of the Invention

The present invention relates to an optical recording media capable of achieving high-density recording.

2. Description of the Related Art

As optical recording media capable of recording information at a high density using light, a phase-change optical recording media capable of rewriting many times and a write-once optical recording media capable of recording only once have been mainly used.

The phase-change optical recording media comprises a recording layer formed of a material in which phase a change by irradiation with light brings about change in reflectance. The phase-change recording layer containing, for example, Ge, Sb, Te, In or Ag as a main component is melted upon irradiation with high-power, short-pulsed light and made amorphous in a cooling stage in which the amorphous region becomes a recording mark. If the recording mark is irradiated with low-power, long-pulsed light, the recording mark is heated to a temperature higher than the crystallizing temperature and, then, is cooled slowly. As a result, the amorphous mark is crystallized, which corresponds to erasure. The recording media using the phase-change recording layer makes it possible to rewrite data by repeating the operations described above. The data can be read by detecting difference in reflectance between the amorphous recording mark and the crystalline space. It follows that the magnitude of the reflectance difference is determined by change in an optical constant of the recording material accompanying the phase change. The recording material used nowadays, which has been found as a result of research over a long time, exhibits very large changes in optical characteristics in accordance with the phase change. However, where recording density is further enhanced in future and the recording mark is made smaller, detection of the reflectance change for the recording material noted above is expected to be hard.

On the other hand, known write-once optical recording media have a recording layer formed of an inorganic material including chalcogenide elements such as a Te compound, or a recording layer formed of a recording material prepared by dispersing in an organic material a dye such as a cyanine derivative, a phthalocyanine derivative, a porphyrin derivative or a metal porphyrin derivative. The inorganic recording layer is formed by a deposition method represented by a dry process such as vacuum evaporation or sputtering. The organic recording layer is formed by a wet process such as spin coating or electrolysis. In the spin coating, a solution prepared by dissolving an organic dye in a solvent such as dichloroethane is dripped onto a substrate while rotating the substrate so as to form a thin film on the substrate. The spin coating is widely accepted as an inexpensive method of forming an organic recording layer. All write-once discs available on the market nowadays operated with a red laser diode, such as CD-R and DVD-R, use the aforementioned organic dyes for the recording layer.

Almost all write-once discs having a recording layer containing an organic dye utilize a recording mechanism with local rupture of the recording layer. To be more specific, when light is focused in a size of about 1 µm on a recording layer by an objective lens, the light is absorbed by the dye and converted into heat, which locally evaporates the dye or deforms a material in contact with the dye. As a result, when light is focused on that portion of the recording layer in read time, the light is scattered to lower reflectance. It follows that the portion is recognized as a recording mark. However, if the dye has excessively high absorbance for the wavelength of the light source, the dye is decomposed by irradiation with read light. Thus, the recording layer should have significantly high absorbance for the wavelength of the light source in order to convert the absorbed light into heat efficiently, while the recording layer should not have excessively high absorption in order to avoid failure of the data in read time. Such being the situation, the write-once discs such as CD-R and DVD±R uses a cyanine-based or phthalocyanine-based dye having an absorption peak in the vicinity of 780 nm or 650 nm, i.e., the wavelength of the light source.

The optical recording media including a rewriting type and write-once type are always required to enhance recording density. Under the circumstances, enhancement in recording density has been pursued by means of: (1) shortening in the wavelength of the light source, and (2) increase in the numerical aperture (NA) of the objective lens. Each of these means is intended to reduce a beam spot focused on the optical recording media so as to form smaller recording marks and read out the recording marks. This is because the recording capacity can be increased by reducing the recording mark. However, since reduction of the mark size is limited, it is necessary to take another measure.

One of approaches to achieve a higher recording density is to increase the difference in optical characteristics between the recording portion and the non-recording portion. The phase-change material used nowadays in the rewritable DVD contains Ge, Sb, Te, In or Ag as a main component, and the composition thereof is chosen to permit a very high reflectance difference between the recording portion and the non-recording portion. Also, the organic dye material used in the write-once DVD, which has also been found as a result of extensive research over a long time, is optimized to achieve the highest reflectance change for the wavelength of the light source. Further, although next-generation recording media of rewritable and write-once types operated under a wavelength of 405 nm are being developed, there has not yet been found a material exhibiting optical change exceeding the level of the recording material used nowadays.

BRIEF SUMMARY OF THE INVENTION

An optical recording media according to an aspect of the present invention comprises a disc substrate and two or more recording layers arranged apart from each other with a dielectric layer interposed therebetween to cause optical change simultaneously by irradiation with light, wherein a first recording layer positioned near the disc substrate has a higher optical change temperature and a higher extinction coefficient compared with those of a second recording layer and a later recording layer.

An optical recording media according to another aspect of the present invention comprises a disc substrate and two or more recording layers arranged apart from each other with a dielectric layer interposed therebetween to cause optical change simultaneously by irradiation with light, wherein a first recording layer positioned near the disc substrate has a lower optical change temperature and a lower extinction coefficient compared with those of a second recording layer and a later recording layer.

DETAILED DESCRIPTION OF THE INVENTION

Figure 1A:
FIGS. 1A and 1B show recording patterns on an optical recording media according to an embodiment of the present invention.

The optical recording media according to an embodiment of the present invention comprises two or more recording layers arranged apart from each other with a dielectric layer interposed therebetween to cause optical change simultaneously by irradiation with light. Since light-irradiated portions of the two or more recording layers cause the optical change simultaneously by which data is recorded, it is possible to enhance the optical change in read time.

The term "optical change temperature" used herein denotes a temperature at which an optical constant of the recording layer is changed by irradiation with light. For example, where the recording layer is heated to exceed the melting point and then cooled so as to cause phase change by which the optical constant thereof is changed, the optical change temperature denotes the melting point. Alternatively, where the recording layer causes various electrochemical or physical phenomena such as oxidation-reduction reaction, phase separation, compound reaction and two-photon absorption by which the optical constant thereof is changed, the optical change temperature denotes the temperature at which these phenomena are caused.

The optical recording media according to a first embodiment of the present invention comprises two or more recording layers arranged apart from each other with a dielectric layer interposed therebetween to cause optical change simultaneously by irradiation with light, in which a first recording layer positioned near the disc substrate has a higher optical change temperature and a higher extinction coefficient (k) compared with those of a second recording layer and a later recording layer.

In the optical recording media according to the first embodiment of the present invention, two or more recording layers are arranged to cause optical change simultaneously by irradiation with light. In view of the focal depth of the recording light, the distance between the first and second recording layers is set to a range between 5 nm or more and 100 nm or less.

In the optical recording media according to the first embodiment of the present invention, the first recording layer preferably has an optical change temperature between 500° C. or higher and 1,000° C. or lower. This temperature range is determined in view of the output of a semiconductor laser (LD) such that the optical recording media according to the first embodiment of the present invention is recorded with the semiconductor laser (LD).

Where the optical change is caused by light absorption in the recording layer and conversion of the absorbed light into heat in the optical recording media according to the first embodiment of the present invention, the first recording layer preferably has an extinction coefficient (k) between 1.0 or more and 4.0 or less. Where the first recording layer has the extinction coefficient (k) in the range noted above, the laser light can be converted efficiently into heat. Where the optical change can be caused reversibly, recording can be performed repeatedly. Where the optical change is irreversible, write-once recording can be performed.

In the optical recording media according to the first embodiment of the present invention, the first recording layer is formed typically of a material capable of reversible change between a crystalline state and an amorphous state upon irradiation with a light beam, the crystalline state and the amorphous state differing from each other in the optical characteristics. The material of the first recording layer includes, for example, alloys such as Ge—Sb—Te, Ge—Bi—Te, and In—Sb—Te. It is also possible to add a small amount of an additional element selected from the group consisting of Co, Pt, Pd, Au, Ag, Ir, Nb, Ta, V, W, Ti, Cr, Zr, Bi and Sn to the alloys noted above. In this case, the resultant alloy exhibits characteristics satisfactory for the first recording layer. Any of the alloys exhibits a melting point of about 600° C., and the melting point of the alloy can be controlled dependent on the type and the amount of the additive element. It is also possible to use a phase-separation type material containing two or more elements not forming a solid solution for the first recording layer. In this case, two or more elements subjected to forced solid solution are phase separated by the irradiation with a laser beam, and the phase-separated portion brings about optical change by which recording is performed. Two or more materials forming a solid solution can also be used for the first recording layer. The recording portion heated by light irradiation forms a solid solution to cause optical change. In order to achieve satisfactory recording-erasing characteristics, the first recording layer preferably has a thickness between 5 nm or more and 20 nm or less for any of these materials.

In the optical recording media according to the first embodiment of the present invention, the second recording layer preferably has an optical change temperature between 100° C. or higher and lower than 500° C. The optical change is caused by a phenomenon similar to that in the first recording layer. It is possible to decrease the amount of heat required for the second recording layer by making the optical change temperature of the second recording layer lower than that of the first recording layer, which makes it possible to decrease a load for the LD. In order to achieve recording in the first and second recording layers simultaneously, the second recording layer preferably has an extinction coefficient (k) in a range between 0.05 or more and 1.0 or less.

In the optical recording media according to the first embodiment of the present invention, the second recording layer is formed typically of a material which causes changes such as oxidation, reduction and decomposition upon irradiation with a light beam. To be more specific, the second recording layer is preferably formed of an oxide containing at least one element selected from the group consisting of Ag, Pt and Cu as a main component. For example, an Ag oxide shows continuous change in an optical constant depending on the degree of oxidation and, thus, an Ag oxide having an extinction coefficient within a range noted above can be easily prepared by controlling the degree of oxidation. In view of the corrosion resistance, a prominent effect can be obtained by adding Pd, Cu, Nb, Bi or In as an alloying element. In order to realize satisfactory recording-erasing characteristics, the second recording layer preferably has a thickness between 5 nm or more and 20 nm or more for any of these materials.

Where the optical recording media according to the first embodiment of the present invention includes three recording layers, it is desirable that the optical change temperatures for the respective recording layers are set to, for example, a range between 500° C. or higher and 1,000° C. or lower for the first recording layer on the light incident side, a range between 300° C. or higher and lower than 500° C. for the second recording layer, and a range between 100° C. and higher and lower than 300° C. for the third recording layer. In order to permit the three recording layers to cause optical change simultaneously by a single light beam irradiation, the extinction coefficients are preferably set to a range between 1.0 or more and 4.0 or less for the first recording layer, a range between 0.5 or more and smaller than 1.0 for the second recording layer, and a range between 0.1 or more and smaller than 0.5 for the third recording layer. The three recording layers can caused the optical change simultaneously by setting the material parameters of the three recording layers as described above. Where the optical recording media includes four or more recording layers, recording can be performed simultaneously by setting the material parameters similarly.

The optical recording media according to a second embodiment of the present invention comprises two or more recording layers arranged apart from each other with a dielectric layer interposed therebetween to cause optical change simultaneously by irradiation with light, in which a first recording layer positioned near the disc substrate has a lower optical change temperature and a lower extinction coefficient (k) compared with those of a second recording layer and a later recording layer.

In the optical recording media according to the second embodiment of the present invention, two or more recording layers are arranged to cause optical change simultaneously by irradiation with light. In view of the focal depth of the recording light, the distance between the first and second recording layers is set to a range between 5 nm or more and 100 nm or less.

In the optical recording media according to the second embodiment of the present invention, the first recording layer preferably has an optical change temperature between 100° C. or higher and lower than 500° C. By setting the optical change temperature of the first recording layer lower than that of the second recording layer, it is possible to decrease the amount of heat required for the first recording layer, which makes it possible to decrease a load for the LD. In order to achieve recording in the first and second recording layers simultaneously, the first recording layer preferably has an extinction coefficient (k) in a range between 0.05 or more and 1.0 or less.

In the optical recording media according to the second embodiment of the present invention, the first recording layer is formed typically of a material which causes changes such as oxidation, reduction and decomposition upon irradiation with a light beam. To be more specific, the first recording layer is preferably formed of an oxide containing at least one element selected from the group consisting of Ag, Pt and Cu. For example, an Ag oxide shows continuous change in an optical constant depending on the degree of oxidation and, thus, an Ag oxide having an extinction coefficient within a range noted above can be easily prepared by controlling the degree of oxidation. In view of the corrosion resistance, a prominent effect can be obtained by adding Pd, Cu, Nb, Bi or In as an alloying element. In order to realize satisfactory recording-erasing characteristics, the first recording layer preferably has a thickness between 5 nm or more and 20 nm or more for any of these materials.

In the optical recording media according to the second embodiment of the present invention, the second recording layer preferably has an optical change temperature between 500° C. or higher and 1,000° C. or lower. The optical change is caused by a phenomenon similar to that in the first recording layer. This temperature range is determined in view of the output of a semiconductor laser (LD) such that the optical recording media according to the second embodiment of the present invention is recorded with the semiconductor laser (LD).

Where the optical change is caused by light absorption in the recording layer and conversion of the absorbed light into heat in the optical recording media according to the second embodiment of the present invention, the second recording layer preferably has an extinction coefficient (k) between 1.0 or more and 4.0 or less. Where the second recording layer has the extinction coefficient (k) in the range noted above, the laser light can be converted efficiently into heat. Where the optical change can be caused reversibly, recording can be performed repeatedly. Where the optical change is irreversible, write-once recording can be performed.

In the optical recording media according to the second embodiment of the present invention, the second recording layer is formed typically of a material capable of reversible change between a crystalline state and an amorphous state upon irradiation with a light beam, the crystalline state and the amorphous state differing from each other in the optical characteristics. The material of the second recording layer includes, for example, alloys such as Ge—Sb—Te, Ge—Bi—Te, and In—Sb—Te. It is also possible to add a small amount of an additional element selected from the group consisting of Co, Pt, Pd, Au, Ag, Ir, Nb, Ta, V, W, Ti, Cr, Zr, Bi and Sn to the alloys noted above. In this case, the resultant alloy exhibits characteristics satisfactory for the second recording layer. Any of the alloys exhibits a melting point of about 600° C., and the melting point of the alloy can be controlled dependent on the type and the amount of the additive element. It is also possible to use a phase-separation type material containing two or more elements not forming a solid solution for the first recording layer. In this case, two or more elements subjected to forced solid solution are phase separated by the irradiation with a laser beam, and the phase-separated portion brings about optical change by which recording is performed. Two or more materials forming a solid solution can also be used for the second recording layer. The recording portion heated by light irradiation forms a solid solution to cause optical change. In order to achieve satisfactory recording-erasing characteristics, the second recording layer preferably has a thickness between 5 nm or more and 20 nm or less for any of these materials.

Where the optical recording media according to the second embodiment of the present invention includes three recording layers, it is desirable that the optical change temperatures for the respective recording layers are set to, for example, a range between 100° C. or higher and lower than 300° C. for the first recording layer on the light incident side, a range between 300° C. or higher and lower than 500° C. for the second recording layer, and a range between 500° C. and higher and 1,000° C. or lower for the third recording layer. In order to permit the three recording layers to cause optical change simultaneously by a single light beam irradiation, the extinction coefficients are preferably set to a range between 0.1 or more and smaller than 0.5 for the first recording layer, a range between 0.5 or more and smaller than 1.0 for the second recording layer, and a range between 1.0 or more and 4.0 or less for the third recording layer. The three recording layers can caused the optical change simultaneously by setting the material parameters of the three recording layers as described above. Where the optical recording media includes four or more recording layers, recording can be performed simultaneously by setting the material parameters similarly.

Further, the capacity on one side of the disc can be remarkably increased by stacking two or more optical recording media according to the first or second embodiment of the present invention with a transparent intermediate layer interposed therebetween. Two optical recording media according to the first or second embodiment of the present invention are stacked on a substrate with a transparent intermediate layer having a thickness of 10 to 50 µm interposed therebetween. In this case, it is desirable that the optical recording media on the light incident side exhibits a transmittance not lower than a prescribed level so as to permit the transmitted light to reach the other optical recording media. In the particular construction, write and read can be performed independently by allowing a light beam to be focused on each of the optical recording media. The thickness of the transparent intermediate layer interposed between the two optical recording media is determined in view of, for example, spherical aberration and a focal depth depending on specifications of the optical system.

Figure 1B:

The write/read method for the optical recording media according to each of the first and second embodiments of the present invention is as follows. In the case of performing mark-length recording, the recording is performed by generating multi-pulse conforming to the mark length. In the case of forming the shortest mark, a single pulse as shown in FIG. 1A is used. With increase in the mark length, a multi-pulse as shown in FIG. 1B. is used. In FIG. 1B, "Pp" denotes a write power, "Pr" denotes a read power, and "Pb" denotes a bottom power. If irradiated with a laser beam of the particular recording pattern, the beam is absorbed mainly by the first and second recording layers, and the absorbed beam is converted into heat to elevate the temperature of the first and second recording layers.

In the optical recording media according to the first embodiment of the present invention, the first recording layer is heated to a temperature between 500° C. or higher and 1,000° C. or lower to cause an optical change and, at the same time, the second recording layer is heated to a temperature between 100° C. or more and lower than 500° C. to cause an optical change.

On the other hand, in the optical recording media according to the second embodiment of the present invention, the first recording layer is heated to a temperature between 100° C. or higher and lower than 500° C. to cause an optical change and, at the same time, the second recording layer is heated to a temperature between 500° C. or higher and 1,000° C. or lower to cause an optical change.

Since the recording is performed simultaneously in the two recording layers in the optical recording media according to the present invention, it is possible to obtain an optical change markedly higher than that obtained in the conventional optical recording media.

Figure 2:
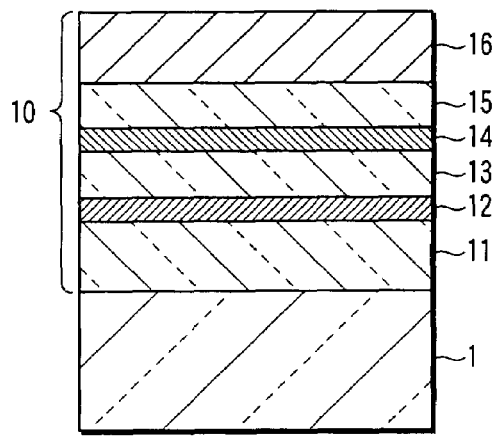
FIG. 2 is a cross-sectional view showing an optical recording media according to an embodiment of the present invention.

FIG. 2 is a cross-sectional view showing an optical recording media according to the first or second embodiment of the present invention. The optical recording media comprises a substrate 1 of resin or glass, and an optical interference layer (a dielectric layer) 11, a first recording layer 12, an optical interference layer (a dielectric layer) 13, a second recording layer 14, an optical interference layer (a dielectric layer) 15 and a reflective layer 16, which are stacked on the substrate 1.

In the optical recording media according to the first embodiment of the present invention, the first recording layer 12 positioned near the substrate 1 has a higher optical change temperature and a higher extinction coefficient compared with those of the second recording layer 14. As a result, the first recording layer 12 is heated to a higher temperature compared with the second recording layer 14. That portion of each of the first and second recording layers on which a laser beam is focused is heated to exceed the optical change temperature of each of the recording layers, with the result that an optical change is caused simultaneously in the two recording layers. Therefore, it is possible to obtain a very large change in reflectance from the optical recording media when the read light is applied.

In the optical recording media according to the second embodiment of the present invention, the first recording layer 12 positioned near the substrate 1 has a lower optical change temperature and a lower extinction coefficient compared with those of the second recording layer 14. As a result, the second recording layer 14 is heated to a higher temperature compared with the first recording layer 12. That portion of each of the first and second recording layers on which a laser beam is focused is heated to exceed the optical change temperature of each of the recording layers, with the result that an optical change is caused simultaneously in the two recording layers. Therefore, it is possible to obtain a very large change in reflectance from the optical recording media when the read light is applied.

Figure 3:
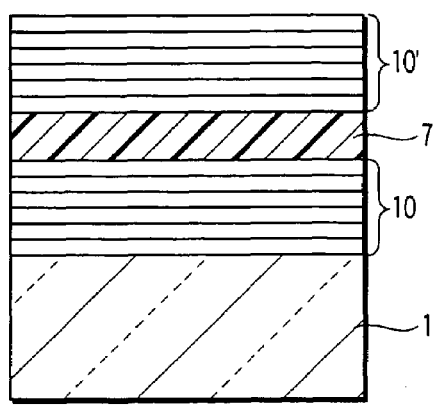
FIG. 3 is a cross-sectional view showing a single-sided, dual-layer disc according to an embodiment of the present invention.

FIG. 3 shows a construction that an optical recording media 10 is formed on the substrate 1 and another optical recording media 10' is stacked on the optical recording media 10 with a transparent intermediate layer 17 interposed therebetween. The optical recording media 10 and 10' may be the optical recording media according to the first or second embodiment of the present invention. Since the optical recording media 10 on the light incident side is transparent to light, it is possible to perform write and read in the optical recording media 10' on the rear side through the optical recording media 10. In this fashion, the optical recording media according to an embodiment of the present invention can be applied to a single-sided, dual layer disc.

EXAMPLES

The present invention will now be described in detail with reference to Examples of the present invention.

Example 1

Figure 4:
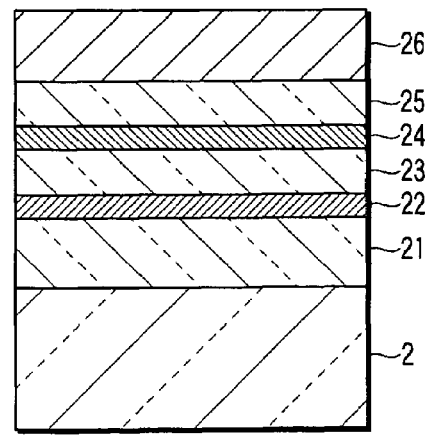
FIG. 4 is a cross-sectional view showing an optical recording media of Example 1.

In this Example, an optical recording media according to the first embodiment of the present invention as shown in FIG. 4 was manufactured.

A $ZnS$—$SiO_2$ film as a dielectric film was deposited by RF magnetron sputtering with a power of 1 kW to form an optical interference layer 21 in a thickness of about 30 nm on a 0.6 mm-thick polycarbonate (PC) disc substrate 2 having grooves formed thereon with a track pitch of 0.35 μm.

A $Ge_2Sb_2Te_5$ film was deposited by RF magnetron sputtering with a power of 0.2 kW to form a first recording layer 22 in a thickness of about 10 nm. The first recording layer 22 was found to have an optical change temperature of about 600° C. and an extinction coefficient of 3.53 (crystal).

A $ZnS$—$SiO_2$ film (a dielectric film) was deposited by RF magnetron sputtering with a power of 1 kW to form an optical interference layer 23 in a thickness of about 10 nm.

An $AgO_x$ film was deposited by RF magnetron sputtering with a power of 0.2 kW, while supplying 10 cc of Ar gas and 15 cc of oxygen gas, under a total gas pressure of 0.4 Pa to form a second recording layer 24 in a thickness of about 15 nm. The second recording layer 24 was found to have an optical change temperature of about 180° C. and an extinction coefficient of 0.11.

A $ZnS$—$SiO_2$ film (a dielectric film) was deposited by RF magnetron sputtering with a power of 1 kW to form an optical interference layer 25 in a thickness of about 40 nm.

An Ag film was deposited by DC magnetron sputtering with a power of 1 kW to form a reflective layer 26 in a thickness of about 20 nm.

Then, the reflective layer 26 was coated with a UV curing resin, followed by applying a 0.6 mm-thick dummy PC disc substrate to the UV curing resin to manufacture an optical disc.

The optical disc thus manufactured was mounted to a laser initializing apparatus so as to initialize the first recording layer. The reflectance after the initialization was 13%.

Write/read performance of the optical disc was evaluated under the conditions shown in Table 1. In all writing operations, the multi-pulse pattern as shown in FIG. 1B was employed. The conditions were also employed in other Examples described herein later.

TABLE 1

| | |
|---|---|
| Light source wavelength | 405 nm |
| NA of objective lens | 0.65 |
| Shortest bit length | 0.13 μm |
| Track pitch | 0.35 μm |

Figure 5:
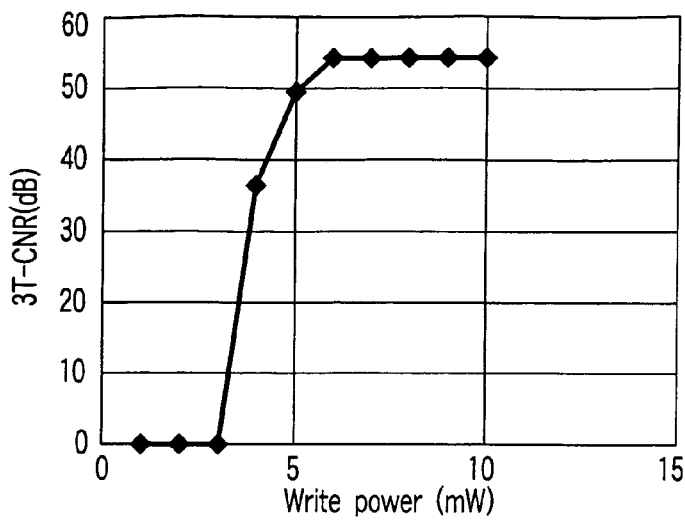
FIG. 5 is a graph showing dependency of 3T-CNR on the write power in the optical recording media of Example 1.

FIG. 5 is a graph showing the change of 3T-CNR relative to the change of the write power, with the read power set at 0.5 mW and the bottom power set at 0.1 mW. Recording was enabled at the write power of 4 mW, and the 3T-CNR was saturated under the write power of 6 mW or more, where a very high 3T-CNR of 54 dB or more was obtained.

A disc having a recording mark formed thereon under the optimum conditions (Pw=7 mW, Pb=0.1 mW) based on the above results was observed with an electron microscope. As a result, it was found that an amorphous recording was formed on the first recording layer, and deformed recording mark was formed on the second recording layer. In this fashion, the optical recording media of the present invention could form recording marks on two recording layers simultaneously, bringing about a very large optical change and a high CNR.

Example 2

Figure 6:
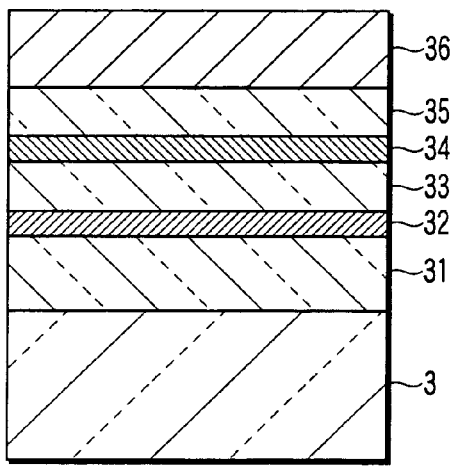
FIG. 6 is a cross-sectional view showing an optical recording media of Example 2.

In this Example, an optical recording media according to the second embodiment of the present invention as shown in FIG. 6 was manufactured.

A $ZnS$—$SiO_2$ film was deposited by RF magnetron sputtering with a power of 1 kW to form an optical interference layer 31 in a thickness of about 50 nm on a 0.6 mm-thick polycarbonate (PC) disc substrate 3 having grooves formed thereon with a track pitch of 0.35 μm.

A $PtO_x$ film was deposited by RF magnetron sputtering with a power of 0.2 kW to form a first recording layer 32 in a thickness of about 10 nm. The RF magnetron sputtering was performed under a total gas pressure of 0.4 Pa, with the flow rate ratio of the Ar gas to the oxygen gas changed in various fashions as shown in A to D in Table 2. The first recording layer 32 was found to have an optical change temperature in a range of 500 to 580° C.

A $ZnS$—$SiO_2$ film was deposited by RF magnetron sputtering with a power of 1 kW to form an optical interference layer 33 in a thickness of about 10 nm.

A $Ge_2Sb_2Te_5$ film was deposited by RF magnetron sputtering with a power of 0.2 kW to form a second recording layer 34 in a thickness of about 10 nm. The second recording layer 34 was found to have an optical change temperature of about 600° C. and an extinction coefficient of 3.53 (crystal).

A $ZnS$—$SiO_2$ film was deposited by RF magnetron sputtering with a power of 1 kW to form an optical interference layer 35 in a thickness of about 50 nm.

An Ag film was deposited by DC magnetron sputtering with a power of 1 kW to form a reflective layer 36 in a thickness of about 10 nm.

Then, the reflective layer 36 was coated with a UV curing resin, followed by applying a 0.6 mm-thick dummy PC disc substrate to the UV curing resin to manufacture an optical disc.

Each of four optical discs differing from each other in the mixed gas flow rate ratio in the stage of depositing the first recording layer was mounted to a laser initializing apparatus so as to initialize the second recording layer. The reflectance after the initialization was within a range of 15% to 20%. Samples having each first recording layer alone formed on a glass substrate were also manufactured for measuring optical constants for the light source wavelength of the evaluating apparatus, in addition to manufacture of the above optical discs.

Write/read performance of each optical disc was evaluated as in Example 1 under the conditions shown in Table 1 given previously. Table 2 shows the 3T-CNR values and other characteristics with respect to the four optical discs. The disc A having a $PtO_x$ film formed under the highest oxygen partial pressure exhibiting an extinction coefficient of 0.3 needed a write power of 8.0 mW, which was slightly higher than that in the other discs, but could provide a high value of 3T-CNR exceeding 53 dB. The disc B having a $PtO_x$ exhibiting a higher extinction coefficient than the disc A, and accordingly, could provide a high value of 3T-CNR exceeding 53 dB under a lower write power. On the other hand, each of discs C and D having a $PtO_x$ film with an extinction coefficient of 1.0 or more formed under lower oxygen partial pressure, provided a low value of 3T-CNR smaller than 50 dB, though the write power was low. The experimental data given in Table 2 support that, in order to perform recording in the first recording layer under the write power of 6 to 8 mW, which is optimum for the second recording layer, the first recording layer should have an appropriate extinction coefficient of 0.05 to 1.0.

TABLE 2

| disc | Ar/O$_2$ flow rate ratio | extinction coefficient k | Pw | 3T-CNR |
|---|---|---|---|---|
| A | 2 cc/23 cc | 0.3 | 8.0 mW | 53.6 dB |
| B | 4 cc/21 cc | 0.7 | 7.5 mW | 53.2 dB |
| C | 6 cc/19 cc | 1.1 | 6.5 mW | 49.7 dB |
| D | 8 cc/17 cc | 1.5 | 6.5 mW | 48.7 dB |

Example 3

Figure 7:
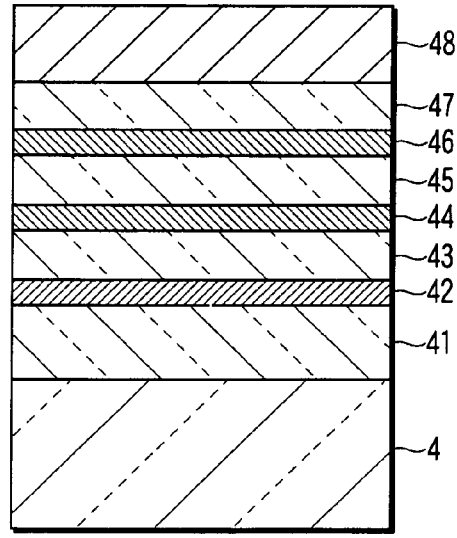
FIG. 7 is a cross-sectional view showing an optical recording media of Example 3.

In this Example, an optical recording media comprising three recording layers as shown in FIG. 7 was manufactured.

A ZnS—SiO$_2$ film was deposited by RF magnetron sputtering with a power of 1 kW to form an optical interference layer 41 in a thickness of about 30 nm on a 0.6 mm-thick polycarbonate (PC) disc substrate 4 having grooves formed thereon with a track pitch of 0.35 μm.

A Ge$_{10}$Sb$_2$Te$_{13}$ film was deposited by RF magnetron sputtering with a power of 0.2 kW to form a first recording layer 42 in a thickness of about 10 nm. The first recording layer 42 was found to have an optical change temperature of about 680° C. and an extinction coefficient of 2.62.

A ZnS—SiO$_2$ film was deposited by RF magnetron sputtering with a power of 1 kW to form an optical interference layer 43 in a thickness of about 10 nm.

An Au$_{72}$Ge$_{28}$ film was deposited by DC magnetron sputtering with a power of 1 kW to form a second recording layer 44 in a thickness of about 8 nm. The second recording layer 44 was found to have an optical change temperature of about 360° C. and an extinction coefficient of 1.85.

A ZnS—SiO$_2$ film was deposited by RF magnetron sputtering with a power of 1 kW to form an optical interference layer 45 in a thickness of about 40 nm.

An AgO$_x$ film was deposited by RF magnetron sputtering with a power of 0.2 kW, while supplying 10 cc of Ar gas and 15 cc of oxygen gas, under a total gas pressure of 0.4 Pa to form a third recording layer 46 in a thickness of about 10 nm. The third recording layer 46 was found to have an optical change temperature of about 180° C. and an extinction coefficient of 0.11.

A ZnS—SiO$_2$ film was deposited by RF magnetron sputtering with a power of 1 kW to form an optical interference layer 47 in a thickness of about 30 nm.

An Au film was deposited by DC magnetron sputtering with a power of 1 kW to form a reflective layer 48 in a thickness of about 10 nm.

Then, the reflective layer 48 was coated with a UV curing resin, followed by applying a 0.6 mm-thick dummy PC disc substrate to the UV curing resin to manufacture an optical disc.

The optical disc thus manufactured was mounted to a laser initializing apparatus so as to initialize the first recording layer 42. The reflectance after the initialization was 20%.

Figure 8:
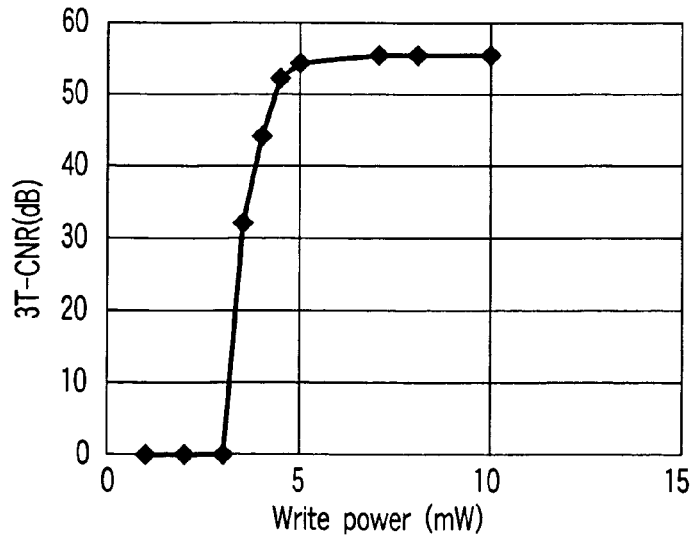
FIG. 8 is a graph showing dependency of 3T-CNR on the write power in the optical recording media of Example 3.

Write/read performance of the optical disc was evaluated as in Example 1 under the conditions shown in Table 1 given previously. FIG. 8 is a graph showing the change of 3T-CNR relative to the change of the write power, with the read power set at 0.5 mW and the bottom power set at 0.1 mW. Recording was enabled at the write power of 3.5 mW, and the 3T-CNR was saturated under the write power of 7 mW or more, where 3T-CNR exceeding 55 dB higher than that for Example 1 was obtained. Thus, it was possible to obtain a higher CNR by providing three recording layers in the optical disc.

Example 4

Figure 9:
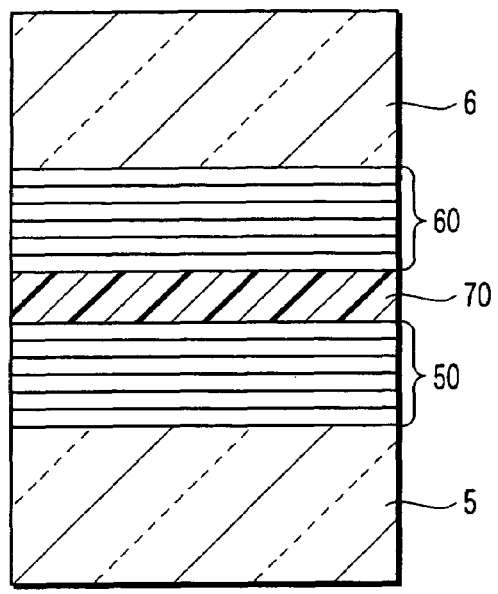
FIG. 9 is a cross-sectional view showing a single-sided, dual-layer disc of Example 4.

In this Example, a single-sided, dual layer disc of the construction shown in FIG. 9 was manufactured.

An optical recording media 50 according to the second embodiment of the present invention was fabricated on a PC disc substrate 5 by the method similar to that employed in Example 2. Incidentally, a PtO$_x$ film was deposited by RF magnetron sputtering with the Ar/O$_2$ gas flow rate ratio set at 4 cc/21 cc to form the first recording layer.

On the other hand, an optical recording media 60 according to the first embodiment of the present invention was fabricated by forming the various layers on a PC disc substrate 6 in the order opposite to that in Example 1.

Further, the optical recording media 50 and 60 were adhered to each other with a UV curing resin layer 70 interposed therebetween to manufacture a single-sided, dual layer disc.

In this single-sided, dual layer disc, a light beam incident on the disc substrate 5 can be independently focused on the optical recording media 50 and on the optical recording media 60, making it possible to double the recording capacity per single side. First, a 3T pattern was recorded in the optical recording media 50 with a write power of 7.5 mW, which was read out with CNR of 52.8 dB. Also, a 3T pattern was recorded in the optical recording media 60 through the optical recording media 50 with a write power of 12 mW which was read out with CNR of 53.0 dB. In this fashion, the present invention also makes it possible to manufacture easily a single-sided, dual layer disc.

Comparative Example 1

Figure 10:
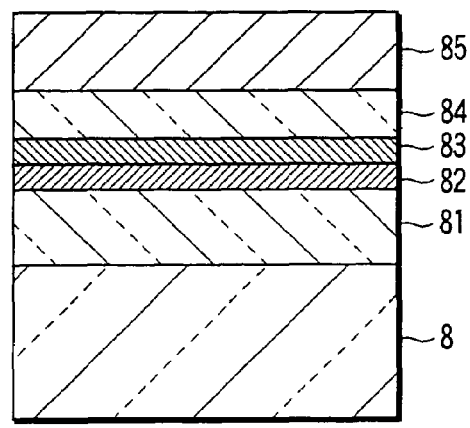
FIG. 10 is a cross-sectional view showing an optical recording media of Comparative Example 1.

An optical recording media of the construction shown in FIG. 10 was manufactured as a comparative example.

A ZnS—SiO$_2$ film was deposited by RF magnetron sputtering with a power of 1 kW to form an optical interference layer 81 in a thickness of about 50 nm on a 0.6 mm-thick polycarbonate (PC) disc substrate 8 having grooves formed thereon with a track pitch of 0.35 μm.

A Ge$_2$Sb$_2$Te$_5$ film was deposited by RF magnetron sputtering with a power of 0.2 kW to form a first recording layer 82 in a thickness of about 10 nm.

An AgO$_x$ film was deposited by RF magnetron sputtering with a power of 0.2 kW, while supplying 10 cc of Ar gas and 15 cc of oxygen gas, under a total gas pressure of 0.4 Pa to form a second recording layer 83 in a thickness of about 10 nm.

A ZnS—SiO$_2$ film was deposited by RF magnetron sputtering with a power of 1 kW so as to form an optical interference layer 84 in a thickness of about 40 nm.

An Ag film was deposited by DC magnetron sputtering with a power of 1 kW to form a reflective layer 85 in a thickness of about 20 nm.

Then, the reflective layer 85 was coated with a UV curing resin, followed by applying a 0.6 mm-thick dummy PC disc substrate to the UV curing resin to manufacture an optical disc. The reflectance of the optical disc was 10%.

Figure 11:
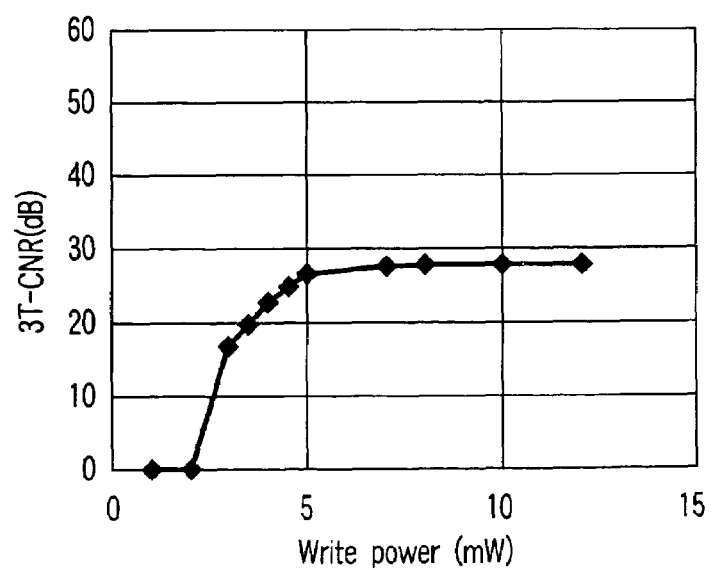
FIG. 11 is a graph showing dependency of 3T-CNR on the write power in the optical recording media of Comparative Example 1.

Write/read performance of the optical disc was evaluated as in Example 1 under the conditions shown in Table 1 given previously. FIG. 11 is a graph showing the change of 3T-CNR relative to the change of the write power, with the read power set at 0.5 mW and the bottom power set at 0.1 mW. Recording was enabled at the write power of 2.5 mW, but the 3T-CNR 3T-CNR did not reach 30 dB even if the write power was increased to 12 mW, resulting in failure to obtain the effect as in Example 1. Thus, satisfactory recording cannot be achieved in the construction that the first recording layer 82 and the second recording layer 83 are not separated from each other as in Comparative Example 1.

Comparative Example 2

Four types of discs E, F, G and H were manufactured as in Example 2. These discs were equal to each other in the layer construction and different from each other in the material of the first recording layer. Write/read performance of each of these discs was evaluated under the conditions equal to those in Example 1. Table 3 shows the result of the evaluation together with the four types of the materials of the first recording layer and the optical change temperature thereof.

Each of the first recording layer materials used in the four types of the discs had an optical change temperature higher than that of the second recording layer and higher than 500° C. Such being the situation, an optical change was not caused simultaneously in the two recording layers, bringing a result that the 3T-CNR did not reach 40 dB.

TABLE 3

| disc | first recording layer material | optical change temperature | 3T-CNR |
| --- | --- | --- | --- |
| E | Si | 1410° C. | 32 dB |
| F | Al | 660° C. | 35 dB |
| G | Ti | 1670° C. | 28 dB |
| H | $Ge_2Sb_2Te_5$ | 600° C. | 29 dB |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical recording media, comprising:
a disc substrate; and
two or more recording layers arranged apart from each other with a dielectric layer interposed therebetween to cause optical change simultaneously by irradiation with light,
wherein a first recording layer positioned nearest the disc substrate has a higher optical change temperature and a higher extinction coefficient compared with those of a second recording layer and any later recording layer,
wherein the first recording layer and the second recording layer are arranged apart from each other by a distance of 5 nm or more and 100 nm or less.

2. The optical recording media according to claim 1, wherein the first recording layer has an optical change temperature between 500° C. or higher and 1,000° C. or lower.

3. The optical recording media according to claim 1, wherein the first recording layer has an extinction coefficient between 1.0 or more and 4.0 or less.

4. The optical recording media according to claim 1, wherein the first recording layer is formed of an alloy selected from the group consisting of a Ge—Sb—Te alloy, a Ge—Bi—Te alloy, and an In—Sb—Te alloy.

5. The optical recording media according to claim 1, wherein the first recording layer has a thickness between 5 nm or more and 20 nm or less.

6. The optical recording media according to claim 1, wherein the second recording layer has an optical change temperature between 100° C. or higher and lower than 500° C.

7. The optical recording media according to claim 1, wherein the second recording layer has an extinction coefficient between 0.05 or more and 1.0 or less.

8. The optical recording media according to claim 1, wherein the second recording layer is formed of an oxide of at least one element selected from the group consisting of Ag, Pt, and Cu.

9. The optical recording media according to claim 1, wherein the second recording layer has a thickness between 5 nm or more and 20 nm or more.

10. The optical recording media according to claim 1, further comprising one or more another optical recording media stacked thereon with an intermediate layer interposed therebetween, wherein the two or more optical recording media are configured to be recorded independently to each other.

11. The optical recording media according to claim 1, further comprising one or more another optical recording media stacked thereon with an intermediate layer interposed therebetween, wherein the two or more optical recording media are configured to be recorded independently to each other.

12. The optical recording media according to claim 1,
wherein the first recording layer has an optical change temperature between 500° C. or higher and 1,000° C. or lower, an extinction coefficient between 1.0 or more and 4.0 or less, is formed of an alloy selected from the group consisting of a Ge—Sb—Te alloy, a Ge—Bi—Te alloy, and an In—Sb—Te alloy, and has a thickness between 5 nm or more and 20 nm or less, and
wherein the second recording layer has an optical change temperature between 100° C. or higher and lower than 500° C., an extinction coefficient between 0.05 or more and 1.0 or less, is formed of an oxide of at least one element selected from the group consisting of Ag, Pt, and Cu, and has a thickness between 5 nm or more and 20 nm or more.

13. An optical recording media, comprising:
a disc substrate; and
two or more recording layers arranged apart from each other with a dielectric layer interposed therebetween to cause optical change simultaneously by irradiation with light,
wherein a first recording layer positioned nearest the disc substrate has a lower optical change temperature and a lower extinction coefficient compared with those of a second recording layer and any later recording layer,
wherein the first recording layer and the second recording layer are arranged apart from each other by a distance of 5 nm or more and 100 nm or less.

14. The optical recording media according to claim 13, wherein the first recording layer has an optical change temperature between 100° C. or higher and lower than 500° C.

15. The optical recording media according to claim 13, wherein the first recording layer has an extinction coefficient between 0.05 or more and lower than 1.0.

16. The optical recording media according to claim 13, wherein the first recording layer is formed of an oxide of an element selected from the group consisting of Ag, Pt, and Cu.

17. The optical recording media according to claim 13, wherein the first recording layer has a thickness between 5 nm or more and 20 nm or less.

18. The optical recording media according to claim 13, wherein the second recording layer has an optical change temperature between 500° C. or higher and 1,000° C. or less.

19. The optical recording media according to claim 13, wherein the second recording layer has an extinction coefficient between 1.0 or more and 4.0 or less.

20. The optical recording media according to claim 13, wherein the second recording layer is formed of an alloy selected from the group consisting of a Ge—Sb—Te alloy, a Ge—Bi—Te alloy, and an In—Sb—Te alloy.

21. The optical recording media according to claim 13, wherein the second recording layer has a thickness between 5 nm or more and 20 nm or less.

22. The optical recording media according to claim 13,
wherein the first recording layer has an optical change temperature between 100° C. or higher and lower than 500° C., has an extinction coefficient between 0.05 or more and lower than 1.0, is formed of an oxide of an element selected from the group consisting of Ag, Pt, and Cu, and has a thickness between 5 nm or more and 20 nm or less, and
wherein the second recording layer has an optical change temperature between 500° C. or higher and 1,000° C. or less, has an extinction coefficient between 1.0 or more and 4.0 or less, is formed of an alloy selected from the group consisting of a Ge—Sb—Te alloy, a Ge—Bi—Te alloy, and an In—Sb—Te alloy, and has a thickness between 5 nm or more and 20 nm or less.

* * * * *